(12) United States Patent
Han et al.

(10) Patent No.: US 12,173,141 B2
(45) Date of Patent: Dec. 24, 2024

(54) DIELECTRICALLY-ENHANCED POLYETHYLENE FORMULATION

(71) Applicant: Dow Global Technologies LLC, Midland, MI (US)

(72) Inventors: Suh Joon Han, Schwenksville, PA (US); Suzanne M. Guerra, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 800 days.

(21) Appl. No.: 17/279,231

(22) PCT Filed: Sep. 30, 2019

(86) PCT No.: PCT/US2019/053720
§ 371 (c)(1),
(2) Date: Mar. 24, 2021

(87) PCT Pub. No.: WO2020/072333
PCT Pub. Date: Apr. 9, 2020

(65) Prior Publication Data
US 2022/0049073 A1 Feb. 17, 2022

Related U.S. Application Data

(60) Provisional application No. 62/741,936, filed on Oct. 5, 2018.

(51) Int. Cl.
*C08L 23/06* (2006.01)
*C08K 5/00* (2006.01)
*C08K 5/098* (2006.01)
*C08L 23/08* (2006.01)

(52) U.S. Cl.
CPC ............ *C08L 23/06* (2013.01); *C08K 5/0083* (2013.01); *C08K 5/098* (2013.01); *C08L 23/0815* (2013.01); *C08L 2203/206* (2013.01); *C08L 2205/025* (2013.01); *C08L 2205/24* (2013.01); *C08L 2207/062* (2013.01); *C08L 2207/066* (2013.01)

(58) Field of Classification Search
CPC .... C08L 23/04; C08L 23/06; C08L 2205/025; C08L 2205/03; C08L 2207/06; C08L 2207/062
See application file for complete search history.

(56) References Cited

U.S. PATENT DOCUMENTS

| | | | |
|---|---|---|---|
| 4,305,849 A | 12/1981 | Kawasaki et al. | |
| 4,452,937 A | 6/1984 | Keogh | |
| 5,246,783 A | 9/1993 | Spenadel et al. | |
| 6,203,907 B1 | 3/2001 | Keogh | |
| 6,496,629 B2 | 12/2002 | Ma et al. | |
| 6,534,604 B2 | 3/2003 | Loveday et al. | |
| 6,562,905 B1 | 5/2003 | Nummila-Pakarinen et al. | |
| 6,714,707 B2 | 3/2004 | Rossi et al. | |
| 7,579,408 B2 | 8/2009 | Walton et al. | |
| 8,679,639 B2 | 3/2014 | Oswald et al. | |
| 8,829,115 B2 | 9/2014 | Hermel-Davidock et al. | |
| 9,102,819 B2 | 8/2015 | Kapur et al. | |
| 9,115,275 B2 | 8/2015 | Kupar et al. | |
| 9,187,628 B2 | 11/2015 | McLeod et al. | |
| 9,631,059 B2 | 4/2017 | Demirors et al. | |
| 9,834,712 B2 | 12/2017 | Kapur et al. | |
| 10,703,869 B2 | 7/2020 | Wang et al. | |
| 10,913,041 B2 | 2/2021 | Traisilanun et al. | |
| 2006/0173123 A1 | 8/2006 | Yang et al. | |
| 2008/0118749 A1 | 5/2008 | Aubee et al. | |
| 2010/0105839 A1 | 4/2010 | Mehta | |
| 2011/0130533 A1 | 6/2011 | Karjala et al. | |
| 2011/0290317 A1 | 12/2011 | Naumovitz et al. | |
| 2013/0087199 A1 | 4/2013 | Naumovitz et al. | |
| 2014/0287215 A1* | 9/2014 | Chandak | C08L 23/0815 428/219 |
| 2015/0210841 A1 | 7/2015 | Seliskar et al. | |
| 2015/0344681 A1 | 12/2015 | Kapur et al. | |
| 2018/0079898 A1 | 3/2018 | Wang | |

FOREIGN PATENT DOCUMENTS

| | | | |
|---|---|---|---|
| EP | 1731565 | 12/2006 | |
| EP | 1881507 | 1/2008 | |
| EP | 2439239 | 4/2012 | |
| EP | 2938646 | 5/2017 | |
| EP | 3293211 | 3/2018 | |
| WO | 2007065644 | 6/2007 | |
| WO | 2008006586 | 1/2008 | |
| WO | 2008058371 | 5/2008 | |
| WO | 2014000820 | 1/2014 | |
| WO | WO-2014091309 A2 * | 6/2014 | ............ C08K 3/34 |
| WO | WO-2016089495 A1 * | 6/2016 | ............ B32B 27/32 |
| WO | 2016131478 | 8/2016 | |
| WO | 2016137695 | 9/2016 | |
| WO | WO-2016207295 A1 * | 12/2016 | ............ B65D 81/18 |
| WO | 2017084709 | 5/2017 | |
| WO | 2017151358 | 9/2017 | |

OTHER PUBLICATIONS

Weipeng et al., Abstract "Study on Aggregation Structure and Dielectric Strength of XLPE Cable Insulation in Accelerated Thermal-oxidative Aging", Proceedings of the CSEE, 2016, pp. 4770-4777, vol. 36, No. 17.
Karjala, "Detection of low levels of long-chain branching in polyolefins", Annual Technical Conference—Society of Plastics, Engineers, 2008, p. 887-891, 66th.
M.M. Ueki et al. "Influence of Additives on the Dielectric Strength of High-density Polyethylene" IEEE Transact. Dielectr. Electr. Insul 1999 vol. 6 No. 6 pp. 876-881.

(Continued)

*Primary Examiner* — John M Cooney
*Assistant Examiner* — Jeffrey S Lenihan (57) ABSTRACT

A dielectrically-enhanced polyethylene formulation made from (A) a polyethylene-nucleation agent, a dielectrically-enhanced (B) a multimodal ultra-high density polyethylene (multimodal uHDPE) composition, and, optionally, (C) a low density polyethylene (LDPE) polymer. A method of making same, an insulated electrical device comprising same, and a method of using same.

4 Claims, 2 Drawing Sheets

(56) References Cited

OTHER PUBLICATIONS

PCT/US2019/053720, International Search Report and Written Opinion with a mailing date of Dec. 9, 2019.
Office Action from corresponding Japanese Application No. 2021-513204 dated Nov. 2, 2023.

* cited by examiner

Equation 1:  $ZSVR := \dfrac{\eta 0B}{\eta 0L} = \dfrac{\eta 0B}{2.29 \times 10^{-15} \, M_{w\text{-}gpc}^{3.65}}$

FIG. 3

DIELECTRICALLY-ENHANCED POLYETHYLENE FORMULATION

FIELD

Dielectrically-enhanced polyethylene formulation, a method of making same, an insulated electrical device comprising same, and a method of using same.

INTRODUCTION

Patent applications and patents in the field include EP2938646B1, U.S. Pat. Nos. 4,305,849, 4,452,937, 6,203,907B1, 6,562,905B1, 7,579,408B2, 9,102,819B2, 9,115,275B2, 9,187,628B2, 9,631,059B2, 9,834,712B2, U.S. 20150344681A1, WO2007065644A1, WO2008006586A1, WO2008058371A1, WO2014000820A1, WO2016-131478A1, WO2017084709A1, and WO2017151358A1.

SUMMARY

Operating electrical components generate heat. Insulation layers protect the heated electrical components from water and component failure and protect component users from electrical shocks. Insulation layers composed of prior polyethylene formulations suffer from water treeing, loss of alternating current (AC) electrical breakdown strength and electrical treeing, and ultimately failure of the insulation layers and the electronic components they are supposed to protect. We provide a polyethylene formulation for use as an improved dielectric material in insulated electrical devices.

A dielectrically-enhanced polyethylene formulation made from (A) a polyethylene-nucleation agent, a dielectrically-enhanced (B) a multimodal ultra-high density polyethylene (multimodal uHDPE) composition, and, optionally, (C) a low density polyethylene (LDPE) polymer.

A method of making the dielectrically-enhanced polyethylene formulation.

An insulated electrical device comprising (1) an electrical component and (2) an insulation component, disposed in operative contact with the electrical component, the insulation component comprising a dielectrically-enhanced polyethylene formulation.

A method of using the insulated electrical device.

DETAILED DESCRIPTION

The Summary and Abstract are incorporated here by reference. Examples of embodiments include, but are not limited to, the following numbered aspects.

Aspect 1. A dielectrically-enhanced polyethylene formulation (dielectrically-enhanced polyethylene formulation) comprising a crystallized melt-blend of constituents (A), (B), and optionally (C): from 0.01 to 1.00 weight percent (wt %) of (A) a polyethylene-nucleation agent; from 29.00 to 99.99 weight percent of (B) a multimodal ultra-high density polyethylene (multimodal uHDPE) composition, comprising a long-chain branched polyethylene (LCB-containing PE) homopolymer component and a linear polyethylene homopolymer component, and characterized by a first density, d1, from 0.958 to 0.970 gram per cubic centimeter (g/cm$^3$), alternatively from 0.958 to 0.965 g/cm$^3$, alternatively from 0.966 to 0.970 g/cm$^3$, measured according to ASTM D792-13, Method B; and from 0.00 to 71.00 wt % of (C) a low density polyethylene (LDPE) polymer; and wherein the dielectrically-enhanced polyethylene formulation has a degree of crystallinity of from 40.0% to <85.0%, alternatively from 45% to <85%, alternatively from 50.0% to 80.0%, alternatively from 51% to 59%, alternatively from 75% to 79%, measured according to Degree of Crystallinity Test Method. The dielectrically-enhanced polyethylene formulation is made by making a mixture of (A), melt of (B), and melt of any (C) (a uniform blend thereof); and cooling the mixture below a melting temperature of (B) and, optionally, (C); thereby making the dielectrically-enhanced polyethylene formulation. Constituent (A) may be added to constituent (B) before or during the making a mixture step. The dielectrically-enhanced polyethylene formulation is characterized by a first AC electrical breakdown strength retention value, bsr1, of 80% to 99%, wherein brs1 is measured according to Accelerated Wet Aging Test Method. The wt % are calculated based on total weight (100.00 wt %) of the dielectrically-enhanced polyethylene formulation.

Aspect 2. The dielectrically-enhanced polyethylene formulation of aspect 1 wherein the dielectrically-enhanced polyethylene formulation does not contain the (C) LDPE polymer, and the dielectrically-enhanced polyethylene formulation is characterized by any one of limitations (i) to (iii): (i) a second density, d2, wherein d2 is ≤0.972 g/cm$^3$, and d2 is from 0.0010 to 0.0100 g/cm$^3$, alternatively from 0.0030 to 0.0090 g/cm$^3$, alternatively from 0.0040 to 0.0070 g/cm$^3$ higher than d1, wherein d1 and d2 are measured according to ASTM D792-13, Method B; (ii) a degree of crystallinity of from 50.0% to 80.0%, measured according to the Degree of Crystallinity Test Method; and (iii) both (i) and (ii). The density, d2, may be determined when the dielectrically-enhanced polyethylene formulation is free of any additive.

Aspect 3. The dielectrically-enhanced polyethylene formulation of aspect 1 wherein the dielectrically-enhanced polyethylene formulation contains from 1 to 71 wt % of the (C) LDPE polymer, and the (C) LDPE polymer is characterized by an elastic modulus at a temperature from 110° to 130° C., measured according to the Elastic Modulus Test Method; a zero shear viscosity at 190° C., measured according to the Zero Shear Viscosity (ZSV) Test Method; a degree of crystallinity, measured according to the Degree of Crystallinity Test Method; and a second AC electrical breakdown strength retention value, bsr2, measured according to Accelerated Wet Aging Test Method; and the dielectrically-enhanced polyethylene formulation is characterized by any one of limitations (i) to (viii): (i) an elastic modulus measured at a temperature from 110° to 130° C. that is greater than 5 megapascals (5 MPa) and greater than the elastic modulus of the (C) LDPE polymer, both measured according to the Elastic Modulus Test Method; (ii) a zero shear viscosity at 190° C. that is greater than the zero shear viscosity at 190° C. of the (C) LDPE polymer, both measured according to the Zero Shear Viscosity (ZSV) Test Method; (iii) a degree of crystallinity from 50.0% to 85.0%, measured according to the Degree of Crystallinity Test Method; (iv) the AC electrical breakdown strength retention value, bsr1, that is at least 10.0%, alternatively at least 15.0%, alternatively at least 20.0% higher than the AC electrical breakdown strength retention value, bsr2, of the (C) LDPE polymer, wherein bsr1 and bsr2 are measured according to Accelerated Wet Aging Test Method; (v) both (i) and (ii); (vi) both (i) and (iii); (vii) both (ii) and (iii); and (viii) each of (i), (ii), and (iii).

Aspect 4. The dielectrically-enhanced polyethylene formulation of any one of aspects 1 to 3 wherein the (A) polyethylene-nucleation agent is characterized by any one of limitations (i) to (iii): (i) the (A) polyethylene-nucleation agent is selected from the group consisting of (A1) to (A7): (A1) calcium (1R,2S)-cis-cyclohexane-1,2-dicarboxylate (1:1); (A2) calcium stearate (1:2); (A3) zinc stearate (1:2); (A4) a combination of (A1) and (A2); (A5) a combination of (A1) and (A3); (A6) a combination of (A2) and (A3); and (A7) a combination of (A1), (A2), and (A3); (ii) the amount of the (A) polyethylene-nucleation agent is from 0.05 to 0.50 wt %, alternatively from 0.10 to 0.30 wt % of the total weight of the dielectrically-enhanced polyethylene formulation; (iii) both (i) and (ii).

Aspect 5. The dielectrically-enhanced polyethylene formulation of any one of aspects 1 to 4 wherein the total amount of the (A) nucleation agent, (B) multimodal uHDPE composition, and any (C) LDPE polymer, is less than 100.00 wt % of the (2) insulation component, and the (2) insulation component further comprises at least one of constituents (D) to (J): (D) an organic peroxide; (E) an antioxidant; (F) a crosslinking agent; (G) a stabilizer; (H) a flame retardant; (I) an olefin-functional hydrolyzable silane; and (J) a hydrolyzable-silane-functional polyethylene; or any six of constituents (D) to (J). The degree of crystallinity of the dielectrically-enhanced polyethylene formulation of aspect 5 is measured before any constituents (D), (F), (G), (H), (I), and (J) are added thereto.

Aspect 6. A method of making a dielectrically-enhanced polyethylene formulation, the method comprising making a mixture of constituents (A), melt of (B), and optionally melt of (C): from 0.01 to 1.00 weight percent (wt %) of (A) a polyethylene-nucleation agent; from 29.00 to 99.99 weight percent of a melt of (B) a multimodal ultra-high density polyethylene (multimodal uHDPE) composition, comprising a long chain branched polyethylene (LCB-containing PE) homopolymer component and a linear polyethylene homopolymer component, and characterized by a first density, d1, from 0.958 to 0.970 g/cm$^3$, alternatively from 0.958 to 0.965 g/cm$^3$, alternatively from 0.966 to 0.970 g/cm$^3$, measured according to ASTM D792-13, Method B; and from 0.00 to 71.00 wt % of a melt of (C) a low density polyethylene (LDPE) polymer; and cooling the mixture below a melting temperature of (B) and, optionally, (C); thereby making the dielectrically-enhanced polyethylene formulation, which is characterized by a first AC electrical breakdown strength retention value, bsr1, of 80% to 99%, wherein brs1 is measured according to Accelerated Wet Aging Test Method; and wherein the dielectrically-enhanced polyethylene formulation has a degree of crystallinity of from 40.0% to <85.0%, alternatively from 45% to <85%, alternatively from 50.0% to 80.0%, alternatively from 51% to 59%, alternatively from 75% to 79%, measured according to Degree of Crystallinity Test Method. The wt % are calculated based on total weight (100.00 wt %) of the dielectrically-enhanced polyethylene formulation. The method may comprise making the dielectrically-enhanced polyethylene formulation described in any one of aspects 1 to 5.

Aspect 7. An insulated electrical device comprising (1) an electrical component and (2) an insulation component, disposed in operative contact with the electrical component, the insulation component comprising, alternatively consisting of, the dielectrically-enhanced polyethylene formulation (dielectrically-enhanced polyethylene formulation) of any one of aspects 1 to 5. Alternatively, the dielectrically-enhanced polyethylene formulation may be that made by the method of aspect 6.

Aspect 8. The insulated electrical device of aspect 7 wherein the (1) electrical component comprises (1a) a conductive element in need of electrical insulation and, optionally, (1b) a semiconductive shield coating disposed in direct contact with the conductive element; wherein when the (1b) is absent the (2) insulation component is disposed in direct contact with the (1a) conductive element and when the (1b) is present the (2) insulation component is disposed in direct contact with the (1b) semiconductive shield coating, which is disposed between (1a) and (2).

Aspect 9. The insulated electrical device of aspects 7 or 8, selected from the group consisting of: an insulated battery; an insulated connector; an insulated diode; an insulated display; an insulated fuel cell; an insulated electrical generator; an insulated integrated circuit; an insulated inverter; an insulated photovoltaic cell module; an insulated power cable; an insulated power supply; an insulated terminal; an insulated transistor; and an insulated wire.

Aspect 10. The insulated electrical device of any one of aspects 7 to 9 comprising an insulated power cable wherein the conductive element of the electrical component comprises a conductive core (e.g., a plurality (2 or more) wires, which optionally are bundled together) and wherein the electrical component further comprises, sequentially from the conductive core outward: an inner semiconductive shield layer disposed in direct contact with the conductive core, an insulation layer comprising, alternatively consisting of the insulation component and disposed in direct contact with the inner semiconductive shield layer, an outer semiconductive shield layer disposed in direct contact with the insulation layer, and an outer jacketing layer disposed in direct contact with the outer semiconductive shield layer. The conductive core is the inner most component of the insulated power cable. The outer jacketing layer may comprise an uncrosslinked or crosslinked polyolefin polymer.

Aspect 11. A method of conducting electricity, the method comprising applying a voltage across the conductive core of the insulated power cable of the insulated electrical device of aspect 10 so as to generate a flow of electricity through the conductive core.

The dielectrically-enhanced polyethylene formulation is free of an electrically conductive additive or filler. Examples of electrically conductive fillers that are excluded therefrom are carbon black, carbon nanotubes, graphite, graphene, and conductive metals.

The dielectrically-enhanced polyethylene formulation. The dielectrically-enhanced polyethylene formulation has increased AC electrical breakdown strength than a comparative crosslinked low density polyethylene containing a tree-retardant additive (TR-XLPE) Without being bound by theory, it is believed that the increase in retention of AC electrical breakdown strength of the dielectrically-enhanced polyethylene formulation relative to the (C) LDPE polymer after both are separately wet-aged as 40 mils (1.016 millimeter (mm)) thick compression-molded plaques according to Accelerated Wet Aging Test Method (6 kilovolts (kV) electrical stress, 1 kilohertz (kHz) alternating current after aging submerged in 0.01 Molar aqueous NaCl at 23° C. for 21 days) is because the dielectrically-enhanced polyethylene formulation has increased resistance to formation of physical voids therein when exposed to water at elevated temperature. Also, it is believed that the dielectrically-enhanced polyethylene formulation has increased resistance to phase change from a crystalline phase to an amorphous phase at an operating temperature of a power cable. Generally, solubility of water in a polyethylene polymer increases with increasing temperature and solubility of water in amorphous polyethylene polymer is higher than in crystalline polyethylene polymer. The dielectrically-enhanced polyethylene formulation is better equipped to resist the incorporation of water at elevated temperature. By resisting incorporation of water at elevated temperature, an insulation layer composed of the dielectrically-enhanced polyethylene formulation has better resistance to water treeing and electrical treeing when the power cable is exposed to typical operating conditions such as water (e.g., rain, snow, humidity) and internally generated heat (from electrical resistance in the conductive core of the power cable). It is also believed that the increase in retention of AC electrical breakdown strength of the dielectrically-enhanced polyethylene formulation is a result of how and with what the dielectrically-enhanced polyethylene formulation is made.

The method of making of the dielectrically-enhanced polyethylene formulation comprises the mixture making step. The mixture making step makes the mixture of the (A) polyethylene-nucleation agent, a melt of the (B) multimodal uHDPE composition, and, if any, a melt of the (C) LDPE polymer. The making step of any one embodiment of the invention may comprise heating constituents (A), (B), and optionally (C) to an initial temperature that is from 10° to 70° C. higher than the melting temperature of (B) or of a combination of (B) and (C) with agitation (blending), e.g., in an extruder, thereof to give the mixture at the initial temperature. The melting temperature of (B) or of the combination of (B) and (C) will depend upon the particular composition of (B) or of the combination of (B) and (C), respectively. For any particular composition, the melting temperature may be readily determined by slowly heating (e.g., at heating rate of 1° C. per minute) a sample of the composition while monitoring the sample's temperature, and recording as the melting temperature the temperature at which all the sample is just completely melted. Typically heating to an initial temperature of from 140° to 200° C., alternatively from 140° to 185° C., alternatively from 190° to 205° C. is sufficient to melt (B) or the combination of (B) and (C) and form the mixture.

The making step disperses constituent (A) in the melt of (B) and, optionally melt of (C), such as by blending, stirring, mixing, or agitating the mixture in the making step. The making step uniformly distributes the constituents (A), melt of (B), and optionally melt of (C) are uniformly distributed throughout the mixture. The mixture may be made by any effective method, including a direct method or a masterbatch method. The direct method of making the mixture comprises blending a selected amount of (A) directly with a melt of (B) (reactor resin), and optionally a melt of (C), to directly make the mixture, which contains the from 0.01 to 1.00 wt % of (A). The masterbatch method of making the mixture comprises blending a melt of a reactor resin-form of the (B) multimodal uHDPE composition with a melt of a masterbatch of (B) multimodal uHDPE composition as so-called reactor resin, wherein the masterbatch contains greater than 1.00 wt % amount (e.g., from 2 to 20 wt %) of the (A) polyethylene-nucleation agent than is desired in the mixture. The masterbatch may be made by melt blending the reactor resin form of the (B) multimodal uHDPE composition with from 2 to 20 wt % of the (A) polyethylene-nucleation agent, and allowing the resulting melt blend to solidify. Reactor resin means an untreated resin obtained from a polymerization reactor in which it was made, and used as is or used after being pelletized. Alternatively, the masterbatch may be made by blending a melt of a unimodal uHDPE carrier resin with greater than 1.00 wt % of the (A) polyethylene-nucleation agent.

The method of making of the dielectrically-enhanced polyethylene formulation also comprises the mixture cooling step, which comes after the mixture forming step. The cooling step of any one embodiment of the invention may comprise cooling the made mixture from the initial temperature to a final temperature of from 20° to 30° C.

The cooling step may be subdivided into substeps comprising first cooling the mixture from the initial temperature to a first cooled temperature that is just above (e.g., from 1° to 10° C. higher than) a last melting peak temperature of (B) or of the combination of (B) and (C) at any achievable cooling rate, then further cooling the mixture from the first cooled temperature to an intermediate temperature that is just below (e.g., from 1° to 10° C. lower than) the melting peak temperature of (B) or of the combination of (B) and (C) at a cooling rate of from 0.1° to 20° C., then holding (for isothermal cooling) or continue cooling for dynamic cooling (e.g., at the cooling rate of 0.1° to 20° C.) the mixture at the intermediate temperature until crystallizing of (B) or the combination of (B) and (C) is complete (no liquid polymer is observed) and the dielectrically-enhanced polyethylene formulation is made, and then cooling the dielectrically-enhanced polyethylene formulation from the intermediate temperature to the final temperature at any achievable cooling rate. The rate of cooling from the first cooled temperature to the intermediate temperature may be controlled, and this could enhance the retention of AC electrical breakdown strength and/or density of the dielectrically-enhanced polyethylene formulation.

For example, if (B) has a melting peak temperature from 133° to 134° C. and a last melting peak temperature of 140° to 141° C., the typical first cooled temperature may be in a range from 142° to 147° C., respectively, and the typical intermediate temperature may be in the range from 128° to 132° C., respectively. If the combination of (B) and (C) has a melting peak temperature of 128° to 135° C. and a last melting peak temperature of 137° to 145° C., the typical first cooled temperature may be in a range from 138° to 150° C., respectively, and the typical intermediate temperature may be in the range from 123° to 130° C., respectively. In some aspects the any one embodiment of the cooling step may be combined with the any one embodiment of the aforementioned making step.

The melting peak temperature and the last melting peak temperature are determined according to the Differential Scanning calorimetry (DSC) Test Method. The last melting peak temperature is the temperature at which a remaining trace of crystals melt in a DSC sample.

The dielectrically-enhanced polyethylene formulation is as described above. The dielectrically-enhanced polyethylene formulation may be further characterized as having a melt index ($I_2$) from 0.5 to 20 grams per 10 minutes (g/10 min.), measured according to the Melt Index Test Method; and/or a density from 0.86 to 1.00 g/cm$^3$.

The dielectrically-enhanced polyethylene formulation comprises the (A) polyethylene-nucleation agent. The (A) may be composed of any non-polyolefin material that is effective for nucleating a polyethylene. Many polypropylene-nucleation agents are known, but most are not effective for nucleating a polyethylene. Polypropylene-nucleation agents that are not effective for nucleating polyethylenes are excluded from the invention.

The (A) polyethylene-nucleation agent is particulate solid having a melting point high enough that it remains a solid in the melt of (B) and, optionally, melt of (C). Without being bound by theory, we believe that the constituent (A) functions during the cooling step by serving as focal centers around which the melt can nucleate, i.e., form and organize solid structures or lamellae. These lamellae then grow in size during the cooling step until all of the melt of (B) and, optionally, melt of (C), has solidified, at which point the making of the dielectrically-enhanced polyethylene formulation is finished. The cooling step may comprise active cooling or passive cooling. Active cooling applies an external temperature regulating material or device to the melt to decrease or increase the rate of heat loss from the melt relative to the rate of heat loss from passive cooling. The cooling applied by the external temperature regulating material or device may be isothermal (constant temperature) or dynamic (e.g., continually decreasing temperature). Passive cooling, or natural cooling, allows the melt to stand in ambient atmosphere on a support that is not actively heated or cooled. During manufacture of insulated power cables, the cooling step typically comprises active cooling. The rate of cooling may be from 0.1° to 20° C. per minute, depending on the cooling method (active or passive), mass of the melt being cooled, and starting temperature of the melt at which cooling begins.

The (A) polyethylene-nucleation agent may be a calcium or zinc salt of a 1,2-dicarboxylic acid or of stearic acid. The (A) may be selected from the group consisting of (A1) to (A7): (A1) calcium (1R,2S)-cis-cyclohexane-1,2-dicarboxylate (1:1); (A2) calcium stearate (1:2); (A3) zinc stearate (1:2); (A4) a combination of (A1) and (A2); (A5) a combination of (A1) and (A3); (A6) a combination of (A2) and (A3); and (A7) a combination of (A1), (A2), and (A3). The effective amount of the (A) is from 0.01 to 1.0 weight percent (wt %), alternatively from 0.05 to 0.50 wt %, alternatively from 0.10 to 0.30 wt % of a sum of the weights of (A), (B), and any (C).

The dielectrically-enhanced polyethylene formulation also comprises the constituent (B) multimodal ultra-high density polyethylene (multimodal uHDPE) composition. The (B) multimodal uHDPE composition comprises a long chain branched polyethylene (LCB-containing PE) homopolymer component and a linear polyethylene homopolymer component. Characteristic properties of (B) are measured on (B) that is free of the (A) polyethylene-nucleation agent. The (B) is characterized by a first density, d1, from 0.958 to 0.969 g/cm$^3$, alternatively from 0.958 to 0.968 g/cm$^3$, alternatively from 0.958 to 0.967 g/cm$^3$, alternatively from 0.958 to 0.965 g/cm$^3$. The (B) multimodal uHDPE composition may be from 49 to 99.99 wt %, alternatively from 65.0 to 99.99 wt %, alternatively from 95.00 to 99.99 wt % of the (2) insulation component.

The (B) multimodal uHDPE composition may be characterized by any one of properties (a) to (g): (a) a zero shear viscosity ratio (ZSVR) of from 1.0 to 4.0, alternatively from 1.0 to 2.0, alternatively >2.0 to <4.0, measured according to Zero Shear Viscosity Ratio (ZSVR) Test Method (described later); (b) a melt flow ratio ($I_{21}/I_2$) of from 30 to 150; alternatively from 40 to 100, alternatively from 70 to 150, measured according to ASTM 1238-04 (190° C., 21.6 kilograms (kg)/190° C., 2.16 kg); (c) a melt index ($I_2$) from 0.5 g/10 min. to 3.0 g/10 min., alternatively from 0.8 g/10 min. to 1.5 g/10 min., measured according to ASTM 1238-04 (190° C., 2.16 kg); (d) a first density, d1, from 0.958 to 0.970 g/cm$^3$, alternatively from 0.958 g/cm$^3$ to 0.965 g/cm$^3$, alternatively from 0.966 g/cm$^3$ to 0.975 g/cm$^3$, alternatively from 0.966 g/cm$^3$ to 0.970 g/cm$^3$, alternatively from 0.964 g/cm$^3$ to 0.968 g/cm$^3$ (e.g., 0.965 or 0.967 g/cm$^3$), measured according to ASTM D792-13, Method B; (e) the (B) multimodal uHDPE composition is bimodal and/or consists of the LCB-containing PE homopolymer component and the linear polyethylene homopolymer component; (f) the (B) multimodal uHDPE composition is uncrosslinked (but crosslinkable) or crosslinked; (g) the (B) multimodal uHDPE composition is characterized by a third AC electrical breakdown strength retention value, bsr3, (%); and the second AC electrical breakdown strength retention value, bsr2, (%) of the dielectrically-enhanced polyethylene formulation is at least 1.0%, alternatively at least 2.0%, alternatively at least 5.0% higher than the bsr3 of (B); wherein bsr2 and bsr3 are measured according to Accelerated Wet Aging Test Method. Alternatively, any one of (h) to (j): (h) any three of (a) to (d); (i) each of (a) to (d); (j) each of (a) to (d) and any one of (e) to (g). The ZVSR is a ratio of the zero shear viscosity (ZSV) of the LCB-containing PE homopolymer component to the ZSV of the linear polyethylene homopolymer component, measured at 190° C. according to the ZSVR Test Method.

The (B) multimodal uHDPE composition may be made by the solution polymerization process and with the polymerization catalysts described in U.S. Pat. No. 8,829,115 B2. For example, the (B) may be made by a process comprising (1) polymerizing ethylene as the only monomer to make the LCB-containing PE homopolymer component of (B), wherein the polymerizing is done in such a way that long chain branches are made in the resulting LCB-containing PE homopolymer; and polymerizing ethylene as the only monomer to make the linear polyethylene homopolymer component of (B), thereby making (B). The LCB-containing PE homopolymer component may consist essentially of, alternatively consist of the LCB-containing PE homopolymer. The linear polyethylene homopolymer component of (B) may consist essentially of, alternatively consist of, the linear polyethylene homopolymer. The linear polyethylene homopolymer itself of the linear polyethylene homopolymer component is free of long chain branching, alternatively free of both long chain branching (LCB) and short chain branching (SCB). The linear polyethylene homopolymer component consisting essentially of the linear polyethylene homopolymer may further have a minor amount of a branched polyethylene homopolymer (different than the LCB-containing PE homopolymer component of (B)) as a byproduct of the polymerizing ethylene step by which the linear polyethylene homopolymer component is made. The linear polyethylene homopolymer may be substantially linear, alternatively linear. The LCB of the LCB-containing PE homopolymer component is an inherent feature of the made using the catalyst and solution polymerization process.

Figure 1:
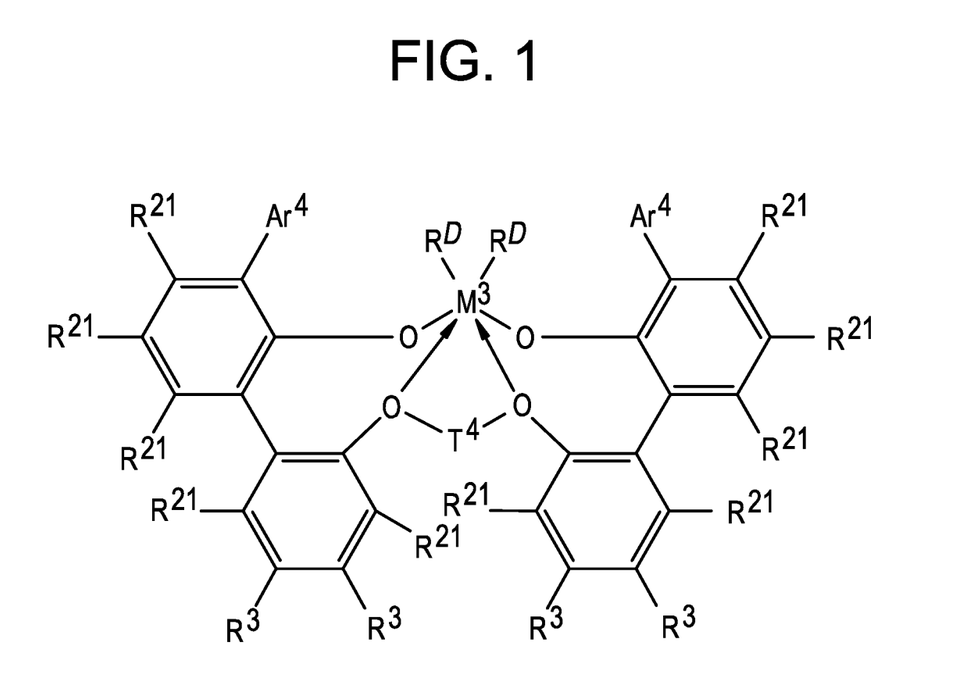
FIG. 1 contains a structural formula of a precatalyst that is a polyvalent aryloxyether of formula (I).

The polymerizing is done in the presence of a first catalyst to make the LCB-containing PE homopolymer component or the linear polyethylene homopolymer component in a first reactor or in a first part of a multi-part reactor; and then (2) reacting freshly supplied ethylene in the presence of a second catalyst comprising an organometallic catalyst thereby making the LCB-containing PE homopolymer component or the linear polyethylene homopolymer component in at least one other reactor or a later part of the multi-part reactor. The first and second catalysts are the same or different and wherein each of the first and second catalyst independently is made by contacting at least one cocatalyst (activator) with a precatalyst that independently is a metal complex of a polyvalent aryloxyether of formula (I) shown in FIG. 1. Formula (I) includes groups $M^3$, $Ar^4$, $T^4$, $R^{21}$, $R^3$, and $R^D$ that are used in U.S. Pat. No. 8,829,115 B2. In formula (I), $M^3$ is Ti, Hf or Zr, alternatively Zr; each $Ar^4$ is independently a substituted $(C_9\text{-}C_{20})$aryl group, wherein each substituent independently is selected from the group consisting of a $(C_1\text{-}C_{20})$alkyl group; a $(C_3\text{-}C_{20})$cycloalkyl group; a $(C_6\text{-}C_{20})$aryl group; a halo-substituted derivative of the $(C_1\text{-}C_{20})$alkyl, $(C_3\text{-}C_{20})$cycloalkyl, or $(C_6\text{-}C_{20})$aryl group; a trihydrocarbylsilyl-substituted derivative of the $(C_1\text{-}C_{20})$alkyl, $(C_3\text{-}C_{20})$cycloalkyl, or $(C_6\text{-}C_{20})$aryl group; and a halohydrocarbyl-substituted derivative of the $(C_1\text{-}C_{20})$alkyl, $(C_3\text{-}C_{20})$cycloalkyl, or $(C_6\text{-}C_{20})$aryl group; with the proviso that at least one substituent of at least one, alternatively each $Ar^4$ lacks co-planarity with the $(C_9\text{-}C_{20})$aryl group to which it is bonded; each $T^4$ is independently in each occurrence a $(C_2\text{-}C_{20})$alkylene, a $(C_3\text{-}C_{20})$cycloalkylene, or a $(C_4\text{-}C_{20})$cycloalkenylene group; each $R^{21}$ is independently hydrogen, halo, hydrocarbyl, trihydrocarbylsilyl, trihydrocarbylsilylhydrocarbyl, alkoxy, or di(hydrocarbyl)amino group of 3 to 50 atoms not counting hydrogen atoms; each $R^3$ is independently hydrogen, halo, hydrocarbyl, trihydrocarbylsilyl, trihydrocarbylsilylhydrocarbyl, alkoxy, or amino of 3 to 50 atoms not counting hydrogen atoms; or wherein two $R^3$ groups on the same arylene ring are bonded together or an $R^3$ group and an $R^{21}$ group on the same or different arylene ring are bonded together and thereby form a divalent ligand group attached to the arylene group in two positions or join two different arylene rings together; and each $R^D$ is independently a halo, a hydrocarbyl, or a trihydrocarbylsilyl group of 4 to 20 atoms not counting hydrogen atoms, or 2 $R^D$ groups are bonded together and thereby form a hydrocarbylene, diene-diyl, or a poly(hydrocarbyl)silylene group.

Long chain branching (LCB) in a polyethylene homopolymer having same: one or more monovalent alkyl groups, pendant on a backbone of the polyethylene homopolymer, wherein each monovalent alkyl group is of formula $-(CH_2CH_2)_mCH_2CH_3$ wherein each subscript m independently is an integer of 20 or greater.

Short chain branching (SCB) in a general polyethylene copolymer having same: a monovalent alkyl group is of formula $-(CH_2CH_2)_nCH_2CH_3$ wherein each subscript n independently is an integer of 0 to 9 on a backbone of the polyethylene copolymer. SCB is different than LCB in that SCB originates from a portion of an alpha-olefin comonomer, whereas LCB originates from ethylene monomer.

Homopolymer: a macromolecule consisting essentially constitutional units made from one and only one monomer, or a collection of such macromolecules. The homopolymer may be linear (i.e., has no SCB or LCB) or branched (contains LCB, but not SCB).

The dielectrically-enhanced polyethylene formulation comprises 0, 1, or more of constituents (C) to (J).

The optional constituent (C): low density polyethylene (LDPE) polymer. The (C) may be made by polymerizing ethylene, and optionally a polar monomer (i.e., polar comonomer), without a polymerization catalyst. The (C) LDPE polymer may be made by polymerizing ethylene, and optionally the polar monomer, in a high pressure reactor to make (C) as a high pressure reactor, low density polyethylene polymer (HPR-LDPE). Methods of making HPR-LDPE are usually free of polymerization catalysts, and instead employ free radical polymerizations. The high pressure reactor may be a tubular reactor or a stirred autoclave reactor. In the tubular reactor, the pressure may be from 170 to 310 megapascals (MPa) (25,000 to 45,000 pounds per square inch (psi)) and the reactor temperature may be from 200° to 350° C. In the stirred autoclave reactor, the pressure may be from 69 to 207 MPa (10,000 to 45,000 psi) and the reactor temperature may be from 175° to 250° C. The tubular reactor-made HPR-LDPE polymer may have different properties than the stirred autoclave-made HPR-LDPE. In some aspects, the (C) is the tubular reactor-made HPR-LDPE polymer, alternatively the stirred autoclave-made HPR-LDPE. In some aspects the constituent units (repeat units) of the (C) LDPE polymer consist of constituent units made from ethylene and free of constituent units made from the polar comonomer. In other aspects the constituent units (repeat units) of the (C) LDPE polymer consist of constituent units made from ethylene and constituent units made from the polar comonomer The polar comonomer may be an unsaturated carboxylic ester such as vinyl acetate, ethyl acrylate, or ethyl methacrylate. The polymerizing without a polymerization catalyst may be carried out in a high pressure tubular or autoclave reactor according to well-known methods.

The (C) LDPE polymer may be characterized by an elastic modulus at a temperature from 110° to 130° C., measured according to the Elastic Modulus Test Method; a zero shear viscosity at 190° C., measured according to the Zero Shear Viscosity (ZSV) Test Method; a degree of crystallinity, measured according to the Degree of Crystallinity Test Method; and a second AC electrical breakdown strength retention value, bsr2, measured according to Accelerated Wet Aging Test Method.

In some aspects, the dielectrically-enhanced polyethylene formulation is free of constituent (C). In other aspects, the dielectrically-enhanced polyethylene formulation further comprises constituent (C). In some aspects, the dielectrically-enhanced polyethylene formulation further comprises the LDPE (C1), described later in the Examples.

The optional constituent (D): organic peroxide. A molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms; or collection of such molecules. The (D) organic peroxide may be added (e.g., via soaking or blending) to the dielectrically-enhanced polyethylene formulation if curing thereof is desired, especially curing comprising heating thereof to a temperature at or above the (D) organic peroxide's decomposition temperature. The (D) organic peroxide may be a monoperoxide of formula $R^O$—O—O—$R^O$, wherein each $R^O$ independently is a $(C_1\text{-}C_{20})$alkyl group or $(C_6\text{-}C_{20})$aryl group. Each $(C_1\text{-}C_{20})$alkyl group independently is unsubstituted or substituted with 1 or 2 $(C_6\text{-}C_{12})$aryl groups. Each $(C_6\text{-}C_{20})$aryl group is unsubstituted or substituted with 1 to 4 $(C_1\text{-}C_{10})$alkyl groups. Alternatively, the (D) may be a diperoxide of formula $R^O$—O—O—R—O—O—$R^O$, wherein R is a divalent hydrocarbon group such as a $(C_2\text{-}C_{10})$alkylene, $(C_3\text{-}C_{10})$cycloalkylene, or phenylene, and each $R^O$ is as defined above. The (D) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane ; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis (t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (D) organic peroxide may be dicumyl peroxide. In some aspects only a blend of two or more (D) organic peroxides is used, e.g., a 20:80 (wt/wt) blend of t-butyl cumyl peroxide and bis(t-butyl peroxy isopropyl)benzene (e.g., LUPEROX D446B, which is commercially available from Arkema). In some aspects at least one, alternatively each (D) organic peroxide contains one —O—O— group. In some aspects the dielectrically-enhanced polyethylene formulation is free of (D). When present, the (D) organic peroxide may be 0.05 to 3.0 wt %, alternatively 0.1 to 3 wt %, alternatively 0.5 to 2.5 wt % of the dielectrically-enhanced polyethylene formulation.

The optional constituent (E) antioxidant. The (E) may be used to provide antioxidizing properties to the dielectrically-enhanced polyethylene formulation. Examples of suitable (E) are a sulfur-containing hindered bisphenol (SCHBP), bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOW-INOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); octadecyl 3,5-di-tert-butyl-4-hydroxyhydrocinnamate; tetrakis(methylene(3,5-di-tert-butyl-4-hydroxyhydrocinnamate)methane; tris(2,4-di-tert-butyl-phenyl)phosphite; pentaerythritol tetrakis(3-(3,5-bis(1,1-dimethylethyl)-4-hydroxyphenyl)propionate (e.g., IRGANOX 1010, CAS No. 6683-19-8); 3,5-bis(1,1-dimethylethyl)-4-hydroxybenzenepropanoic acid 2,2'-thiodiethanediyl ester (e.g., IRGANOX 1035, CAS No. 41484-35-9); and distearyl thiodipropionate ("DSTDP"). The SCHBP may be 4,4'-thiobis(2-(1,1-dimethylethyl)-5-methylphenol) (also known as 4,4'-thiobis(2-tert-butyl-5-methylphenol) and having CAS No. 96-69-5) or 2,2'-thiobis(6-(1,1-dimethylethyl)-4-methylphenol) and having CAS No. 90-66-4.

Alternatively, the SCHBP may be 4,4'-thiobis(2-(1,1-dimethylethyl)-5-methylphenol). In some aspects the dielectrically-enhanced polyethylene formulation is free of (E). When present, the (E) may be 0.01 to 5 wt %, alternatively 0.05 to 1.5 wt %, alternatively 0.1 to 1.0 wt % of the dielectrically-enhanced polyethylene formulation. When both (D) and (E) are present, the weight/weight ratio of (E) antioxidant to (D) organic peroxide may be less than 2 (i.e., (E)/(D) (wt/wt) <2). In some aspects when present the (E) antioxidant is selected from octadecyl 3,5-di-tert-butyl-4-hydroxyhydrocinnamate; tetrakis(methylene(3,5-di-tert-butyl-4-hydroxyhydrocinnamate)methane; tris(2,4-di-tert-butyl-phenyl)phosphite; a combination of any two thereof; and a combination of all three thereof.

The optional constituent (F) a crosslinking agent. The (F) may be a carbon-based coagent comprising a substructural group bonded to two or more olefinic crosslinking groups, wherein the substructural group is an acyclic or cyclic multivalent group that comprises a backbone or ring, respectively, containing in the backbone or ring carbon atoms and, optionally, nitrogen and/or oxygen atoms, but not silicon atoms. Examples are 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; 2,4-diphenyl-4-methyl-1-pentene; 1,3-diisopropenylbenzene; triallyl isocyanurate; triallyl cyanurate; triallyl trimellitate; N,N,N',N',N'',N''-hexaallyl-1,3,5-triazine-2,4,6-triamine; triallyl orthoformate; pentaerythritol triallyl ether; triallyl citrate; triallyl aconitate; trimethylolpropane triacrylate; trim ethylolpropane trimethylacrylate; ethoxylated bisphenol A dimethacrylate; 1,6-hexanediol diacrylate; pentaerythritol tetraacrylate; dipentaerythritol pentaacrylate; tris(2-hydroxyethyl) isocyanurate triacrylate; propoxylated glyceryl triacrylate; a polybutadiene having at least 50 wt % 1,2-vinyl content; trivinyl cyclohexane; and mixtures of any two or more thereof. The carbon-based coagent may be a triazinyl-functional hindered piperidine. The triazinyl-functional hindered piperidine may be any compound, oligomer, or polymer consisting of a triazinyl functional group (i.e., a 1,3,5-triazaphenyl) covalently bonded, directly or indirectly via a linking group, to a hindered piperidinyl functional group. The hindered piperidinyl functional group is a 2,6-dialkyl substituted piperidinyl group, a 2,2,6-trialkyl substituted piperidinyl group, or a 2,2,6,6-tetraalkyl substituted piperidinyl group. Each alkyl group of the hindered piperidinyl functional group independently is a (C1-C4 alkyl), e.g., methyl, ethyl, propyl, 1-methylethyl, or butyl; alternatively methyl. Examples of (C) are (i) a mixture of 1,3,5-Triazine-2,4,6-triamine, N,N'-[1,2-ethanediylbis[[[4,6-bis[butyl(1,2,2,6,6-pentamethyl-4-piperidinyl)amino]-1,3,5-triazin-2-yl]imino]-3,1propanediyl]]-bis[N,N'-dibutyl-N,N'-bis (1,2,2,6,6-pentamethyl-4-piperidinyl)-, and dimethyl succinate polymer with 4-hydroxy-2,2,6,6,-tetramethyl-1-piperidineethanol (e.g., Tinuvin 111); (ii) (poly[[6-(1,1,3,3-tetramethylbutyl) amino]-1,3,5-triazine-2,4-diyl][[2,2,6,6-tetramethyl-4-piperidyl) imino]]hexamethylene (2,2,6,6-tetramethyl-4-piperidyl) imino]]) (Chimassorb 944); (iii) (1,3,5-Triazine-2,4,6-triamine-N,N'-[1,2-ethanediylbis[[[4. 6-bis[butyl(1,2,2,6,6-pentamethyl-4-peperidinyl)amino]-1,3,5-triazin-2-yl]imino]-3,1-propanediyl]]-bis[N,N'-dibutyl-N,N'-bis (1,2,2,6,6-pentamethyl-4-piperidinyl) (Chimassorb 119); and (iv) a reaction product of 1,6-hexanediamine, N,N'-bis(2,2,6,6-tetramethyl-4-piperidinyl)-polymer with 2,4,6-trichloro-1,3,5-triazine with N-butyl-1-butanamine and N-butyl-2,2,6,6-tetramethyl-4-piperidinamine (Chimassorb 2020, CAS 192268-64-7). In some aspects (F) is not present in the dielectrically-enhanced polyethylene formulation. When present, the (F) crosslinking agent may be from 0.15 to 4.9 wt %, alternatively from 0.2 to 4 wt %, alternatively from 0.5 to 3 wt % of the dielectrically-enhanced polyethylene formulation.

The optional constituent (G) a stabilizer. The (G) is a compound that inhibits degradation triggered by light. Examples of suitable (G) are butanedioic acid dimethyl ester, polymer with 4-hydroxy-2,2,6,6-tetramethyl-1-piperidine-ethanol (CAS No. 65447-77-0, commercially LOWILITE 62); and poly[[6-[(1,1,3,3-tetramethylbutyl) amino]-1,3,5-triazine-2,4-diyl][(2,2,6,6-tetramethyl-4-piperidinyl)imino]-1,6hexanediyl[(2,2,6,6-tetramethyl-4-piperidinyl)imino]]) (CAS 71878-19-8/70624-18-9, Chimassorb 994 LD, BASF). In some aspects (G) is not present in the dielectrically-enhanced polyethylene formulation. When present, the (G) may be from 0.001 to 0.4 wt %, alternatively 0.001 to 0.2 wt %, alternatively 0.01 to 0.15 wt %, alternatively 0.01 to 0.10 wt % of the dielectrically-enhanced polyethylene formulation.

The optional constituent (H) flame retardant. The (H) flame retardant is a compound that inhibits or delays the spread of fire by suppressing chemical reactions in a flame. In some aspects (H) flame retardant is (H1) a mineral, (H2) an organohalogen compound, (H3) an (organo)phosphorus compound; (H4) a halogenated silicone; or a combination of any two or more of (H1) to (H4). The (H) may be aluminum trihydrate. In some aspects (H) is not present in the dielectrically-enhanced polyethylene formulation. In some aspects (H) is present in the dielectrically-enhanced polyethylene formulation at a concentration from 0.1 to 20 wt %, alternatively 1 to 10 wt %; and alternatively 5 to 20 wt %; all based on total weight thereof.

The optional constituent (I) an olefin-functional hydrolyzable silane. (I) may be any monosilane containing at least 1, alternatively at least 2, alternatively 3 olefinic groups and at most 3, alternatively at most 2, alternatively 1 hydrolyzable groups (e.g., alkoxy groups). Examples of (I) are is vinyltrimethoxysilane (VTMS), vinyltriethoxysilane (VTES), vinyltriacetoxysilane, or gamma-(meth)acryloxy propyl trimethoxy silane and the hydrolyzable silyl groups are 2-trimethoxysilylethyl, 2-triethoxysilylethyl, 2-triacetoxysilylethyl, or 3-trimethoxysilylpropyloxycarbonylethyl or 3-trimethoxysilylpropyloxycarbonylpropy. In some aspects the dielectrically-enhanced polyethylene formulation is free of (I). When present, (I) may be from 0.1 to 5 wt %, alternatively 0.5 to 4 wt %, alternatively 1 to 3 wt % of the dielectrically-enhanced polyethylene formulation. When present, the dielectrically-enhanced polyethylene formulation may further comprise a catalytically effective amount of a condensation catalyst, such as dibutyltin dilaurate or a sulfonic acid.

The optional constituent (J) a hydrolyzable-silane-functional polyethylene. The (J) may be a poly(ethylene-co-vinyl trialkoxysilane) copolymer made by copolymerizing ethylene monomer and vinyl trialkoxysilane comonomer or (J) may be a vinyl trialkoxysilane-grafted polyethylene wherein the vinyl trialkoxysilane is bonded to the polyethylene after polymerization of ethylene monomer. In some aspects the dielectrically-enhanced polyethylene formulation is free of (J). When present, (J) may be from 0.1 to 5 wt %, alternatively 0.5 to 4 wt %, alternatively 1 to 3 wt % of the dielectrically-enhanced polyethylene formulation.

The dielectrically-enhanced polyethylene formulation may be free of any additives that are not selected from optional constituents (D) to (J). Alternatively, the dielectrically-enhanced polyethylene formulation may be free of constituents (D) to (J) and contain at least one additive selected from a processing aid, a metal deactivator, a corrosion inhibitor, and a filler.

In some aspects the dielectrically-enhanced polyethylene formulation may also contain a treeing retardant (e.g., a poly(ethylene glycol) (PEG)). A treeing retardant is a molecule that inhibits water and/or electrical treeing, or a collection of such molecules. The treeing retardant may be a water treeing retardant or electrical treeing retardant. The water treeing retardant is a compound that inhibits water treeing, which is a process by which polyolefins degrade when exposed to the combined effects of an electric field and humidity or moisture. The electrical treeing retardant, also called a voltage stabilizer, is a compound that inhibits electrical treeing, which is an AC electrical pre-breakdown process in solid electrical insulation due to partial electrical discharges from. Electrical treeing can occur in the absence of water. Water treeing and electrical treeing are problems for insulated power cables that contain a polyolefin coated conductor. Because of its improved retention of AC electrical breakdown strength, other aspects of the dielectrically-enhanced polyethylene formulation beneficially are free of the treeing retardant.

The insulated electrical device comprises the (1) electrical component. The (1) electrical component generates heat when functioning and is in need of electrical insulation. The (1) electrical component may be exposed to moisture (e.g., air containing water vapor) or water (e.g., rain, snow). Thus, the (1) electrical component is in need of protection by the (2) insulation component. The dielectrically-enhanced polyethylene formulation inhibits degrading of the (2) insulation component when the (2) insulation component is exposed to heat and moisture. The inhibition of degradation may be measured in a laboratory according to Accelerated Wet Aging Test Method (21 days exposure, described later) or measured in the field over a longer time period. The (2) insulation component is an electrical insulator that protects the (1) electrical component from water and device failure and protects users of the insulated electrical device from electrical shock.

The insulated electrical device also comprises the (2) insulation component. The (2) insulation component may be free of (lack) any polyolefin that is not (B) or (C); alternatively the (2) insulation component may be free of any organic polymer that is not (B) or (C). The (2) insulation component is free of an additive that may function as an electrical conductor. Thus, (2) is free of additives such as carbon black and particulate metals such as aluminum, copper, gold, or silver.

The insulated electrical device may contain one, two, or more separate (1) electrical components and/or may contain one, two, or more separate (2) insulation components.

The insulated electrical device may be selected from the group consisting of: an insulated battery wherein the electrical component comprises an electrochemical power source; an insulated diode wherein the electrical component comprises a diode device; an insulated display wherein the electrical component comprises a visual display device; an insulated fuel cell wherein the electrical component comprises an electrochemical generator device; an insulated electrical generator wherein the electrical component comprises an electromechanical power source; an insulated integrated circuit wherein the electrical component comprises an integrated circuit device; an insulated inverter wherein the electrical component comprises a direct current-to-alternating current converter device; an insulated photovoltaic cell module wherein the electrical component comprises a photovoltaic cell; an insulated power cable wherein the electrical component comprises a conductive core (e.g., a plurality (2 or more) wires, which optionally are bundled together) and wherein the electrical component further comprises a semiconductive shield layer in direct contact with the conductive core; an insulated power supply wherein the electrical component comprises a power converter device; an insulated connector wherein the electrical component comprises a conductive connecting device for joining conductive cores of two power cables together; an insulated terminal wherein the electrical component comprises a conductive terminal device for joining the conductive element of the electrical component to a terminal of another electrical component; an insulated transistor wherein the electrical component comprises a transistor device; and an insulated wire wherein the electrical component comprises one to four conductive elements (e.g., 1 to 4 wires).

The insulated electrical device may be the insulated battery, insulated fuel cell, electrochemical generator device, insulated electrical generator, insulated photovoltaic cell module, or insulated power supply. The insulated electrical device may be the insulated diode, insulated integrated circuit, or insulated transistor. The insulated electrical device may be the insulated power cable or insulated wire. The insulated electrical device may be insulated connector or insulated terminal. The insulated electrical device may be the insulated inverter or insulated display.

The insulated electrical device may be the insulated power cable or insulated wire. The insulated power cable or insulated wire may comprise a conductive core covered by the insulation component. The conductive core may be solid or stranded (e.g., a bundle of wires). Some power cables may also contain one or more additional elements such as semiconducting layer(s) and/or a protective jacket (e.g., wound wire, tape, or sheath). Examples are coated metal wires and electrical power cables, including those for use in low voltage ("LV", >0 to <5 kilovolts (kV)), medium voltage ("MV", 5 to <69 kV), high voltage ("HV", 69 to 230 kV) and extra-high voltage ("EHV", >230 kV) electricity-transmitting/distributing applications. Evaluations of the insulated power cable may use AEIC/ICEA standards and/or IEC test methods. In the field during operational use, the insulated power cable may be exposed to harmful effects of ultraviolet light (e.g., from the sun), heat up to 90° C. or more (e.g., generated within the cable), and water (e.g., rain, snow, ambient humidity).

The insulated power cable may be used in low, medium, high and extra-high voltage electricity-transmitting applications. A "wire" means a single strand or filament of conductive material, e.g., conductive metal such as copper or aluminum, or a single strand or filament of optical fiber. A "power cable" comprises at least one wire disposed within a semiconductive layer and a covering that may be referred to as an insulation layer. The electrical conductor device may be designed and constructed for use in medium, high, or extra-high voltage applications. Examples of suitable cable designs are shown in U.S. Pat. Nos. 5,246,783; 6,496, 629; and 6,714,707.

The conductive core of the insulated power cable may be composed of one or more metal wires. When the conductive core is "stranded", it contains two or more metal wires, which may be sub-divided into discrete wire bundles. Each wire in the conductive core, whether bundled or not, may be individually coated with the (2) insulation component and/or the discrete bundles may be coated with the (2) insulation component. Each (2) insulation component independently may be a single layer or multilayer covering, coating or sheath. The (2) insulation component primarily function(s) to protect or insulate the conductive core and semiconductive layer(s) from external environments such as sunlight, water, heat, oxygen, other conductive materials (e.g., to prevent short-circuiting), and/or corrosive materials (e.g., chemical fumes).

Embodiments of the insulated electrical device may be used for data-transmitting applications and/or for electricity-transmitting applications, including low, medium, high, and ultra-high voltage applications.

The inventive formulation and product are useful in a variety of other applications including in containers, vehicle parts, and electronics packaging.

Any compound herein includes all its isotopic forms, including natural abundance forms and/or isotopically-enriched forms, which may have medical or anti-counterfeiting uses.

In some aspects any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., C and H required by a polyethylene or C, H, and O required by an alcohol) are not counted.

The following apply unless indicated otherwise. Alternatively precedes a distinct embodiment. ASTM means the standards organization, ASTM International, West Conshohocken, Pennsylvania, USA. IEC means the standards organization, International Electrotechnical Commission, Geneva, Switzerland. Any comparative example is used for illustration purposes only and shall not be prior art. Free of or lacks means a complete absence of; alternatively not detectable. ISO means International Organization for Standardization, Chemin de Blandonnet 8, CP 401-1214 Vernier, Geneva, Switzerland. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C.

Mixture Preparation Method. Using a 300 g-size Brabender mixer operated at 190° C. and 30 rotations per minute (rpm), melt and mix constituent (B), and any optional constituent (C), with constituent (A), to make a mixture for use in the cooling step, which is described below in Compression Molded Plaque Preparation Method.

Compression Molded Plaque Preparation Method. Heat and compress the dielectrically-enhanced polyethylene formulation in a mold at 185° C. and pressure of 13.8 MPa (2,000 pounds per square inch (psi)) for 5 minutes, and then at 185° C. and 345 MPa (25 tons per square inch) for 25 minutes, quench-cooled to room temperature under 345 MPa for 10 minutes, and remove from the mold to give an 20.3 centimeter (cm)×20.3 cm (8 inches×8 inches) compression molded plaque thereof having a specified thickness of 1.016 mm (40 mils).

Accelerated Wet Aging Test Method: perform according to ASTM D149-09 (reapproved 2013), Standard Test Method for Dielectric Breakdown Voltage and Dielectric Strength of Solid Electrical Insulating Materials at Commercial Power Frequencies. Prepare a 40 mils (1.016 millimeter (mm)) thick unaged plaque of a polyethylene resin according to the Compression Molded Plaque Preparation Method. Immerse the unaged plaque in 0.01 molar aqueous sodium chloride solution at 25° C. Subject the immersed plaque to 6 kilovolts (kV) electrical stress for 21 days, except deviate from ASTM D149-09 by using a constant frequency 1 kilohertz (kHz) alternating current instead of 25 to 800 Hz to give an accelerated wet aged plaque, and measure the AC electrical breakdown strength in kV per mm thickness. ASTM D149 says the test may be used at a frequency from 25 to 800 Hz, and says that at frequencies above 800 Hz dielectric heating is a potential problem. Using a constant frequency of 1,000 hertz (1 KHz) accelerates wet aging. Calculate percentage retention of AC electrical breakdown strength equal to 100×(AC electrical breakdown strength in kV/mm of the wet-aged plaque) divided by (AC electrical breakdown strength in kV/mm of the unaged plaque). The higher the percentage retention of AC electrical breakdown strength, the better the electrical insulating ability of the polyethylene resin. Top and bottom electrodes have diameter of 2.54 cm. Applied voltage ramped starting from 0 volts up to the 6 kV at a rate of 500 volts per second. Characterized electrical breakdown as a sudden increase in electrical current in a test circuit, which may activate a sensing element such as a circuit breaker, fuse, or electric-current-sensing circuit. The higher the measured kV/mm value, the greater the applied voltage at time of electrical breakdown, and thus the greater the dielectric breakdown strength of the polyethylene resin tested.

Bimodality Test Method: determine presence or absence of resolved bimodality by plotting dWf/dLogM (mass detector response) on y-axis versus LogM on the x-axis to obtain a GPC chromatogram curve containing local maxima log (MW) values for LMW and HMW polyethylene component peaks, and observing the presence or absence of a local minimum between the LMW and HMW polyethylene component peaks. The dWf is change in weight fraction, dLogM is also referred to as dLog(MW) and is change in logarithm of molecular weight, and LogM is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the formulation by using summed values of the weight fractions (Wf) of the LMW and HMW polyethylene components and the respective number average molecular weights ($M_n$) and weight average molecular weights ($M_w$) by known mathematical treatment of aggregated Schulz-Flory MW distributions.

Density Test Method: measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm$^3$).

Degree of Crystallinity Test Method: measured using differential scanning calorimetry (DSC) according to ASTM F2625-10, Standard Test Method for Measurement of Enthalpy of Fusion, Percent Crystallinity, and Melting Point of Ultra-High Molecular Weight Polyethylene by Means of Differential Scanning calorimetry. The degree of crystallinity is measured on the dielectrically-enhanced polyethylene formulation before any additives other than any optional constituents (C) and (E) are added thereto. The dielectrically-enhanced polyethylene formulation embodiments on which the degree of crystallinity is measured consists essentially of, alternatively consists of, constituents (A), (B), optionally (C), and optionally (E) (e.g., 0, 1, 2, or 3 (E)).

Peak Melting Temperature Test Method: ASTM D3418-15, Standard Test Method for Transition Temperatures and Enthalpies of Fusion and Crystallization of Polymers by Differential Scanning calorimetry.

Elastic Modulus Test Method: measured by dynamic mechanical analysis (DMA). Measured using a DMA Q800 instrument from TA Instruments. Analyzed test samples at a constant frequency of 1 Hz under constant thermal scanning rate of 5° C. per minute from room temperature to 150° C. Measures elastic modulus (stiffness) and damping (energy dissipation) properties and their dependence upon temperature as a test material is deformed under periodic stress.

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (gm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_x$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, /indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in U.S. 2006/0173123 page 24-25, paragraphs [0334] to [0341]. Plot of dW/dLog (MW) on the y-axis versus Log(MW) on the x-axis to give a GPC chromatogram, wherein Log(MW) and dW/dLog (MW) are as defined above.

High Load Melt Index (HLMI or $I_{21}$) Test Method: use ASTM D1238-13, Standard Test Method for Melt Flow Rates of Thermoplastics by Extrusion Platometer, using conditions of 190° C./21.6 kilograms (kg). Report results in units of grams eluted per 10 minutes (g/10 min.).

Long Chain Branching (LCB) Test Method: a relative amount of LCB is indicated by the Zero Shear Viscosity Ratio (ZSVR) Test Method. The greater the ZSVR value, the greater the amount of LCB.

Melt Index ("$I_2$") Test Method: for ethylene-based (co) polymer is measured according to ASTM D1238-13, using conditions of 190° C./2.16 kg, formerly known as "Condition E".

Ratio of HLMI/MI ($I_{21}/I_2$) is an indicator of molecular weight distribution.

Zero Shear Viscosity (ZSV) Test Method: measured at 190° C. using a dynamic stress rheometer (DSR), parallel plate type. Use a 25 mm diameter plate. Sample thickness is 1.27 mm (50 mils). Applied a constant stress of 100 Pa or 250 Pa to the sample at 190° C., and measure the resulting strain over time. Calculate zero shear viscosity from creep recovery test at 190° C. from slope of a creep curve after a steady-state has been reached based on observing strain and time data. Use a SR 200 DSR Rheometrics instrument and its RHIOS operational program (software) to calculate the zero shear viscosity.

Zero Shear Viscosity Ratio (ZSVR) Test Method: performed as described in WO 2017/151358 A1, paragraphs [0071] to [0075]. Obtain zero-shear viscosity obtained via a creep test that is conducted on an AR-G2 stress controlled rheometer (TA Instruments; New Castle, Del.) using 25-mm-diameter parallel plates at 190° C. Set the rheometer oven to 190° C. for at least 30 minutes prior to zeroing fixtures. Then insert a compression molded sample disk between the plates, and allow it to come to equilibrium for 5 minutes. Lower the upper plate down to 50 µm above the desired testing gap. Trim off any superfluous material, and lower the upper plate to create the desired testing gap (1.5 mm). Perform measurements under nitrogen purging at a flow rate of 5 liters per minute (L/min.) Set default creep time for 2 hours. Apply a constant low shear stress of 20 pascals (Pa) for all test samples to ensure that the steady state shear rate is low enough to be in the Newtonian region, e.g., in the range of $10^{-3}$ to $10^{-4}$ per second ($s^{-1}$). Determine steady state by taking a linear regression for all the data in the last 10% time window of the plot of log (J(t)) vs. log(t), where J(t) is creep compliance and t is creep time. If the slope of the linear regression is greater than 0.97, steady state is considered to be reached, and then stop the creep test. In all cases in this study the slope meets the criterion within 2 hours. Determine the steady state shear rate from the slope of the linear regression of all of the data points in the last 10% time window of the plot of ε vs. t, where ε is strain. Determine the zero-shear viscosity from the ratio of the applied stress to the steady state shear rate. In order to determine if the sample is degraded during the creep test, conduct a small amplitude oscillatory shear test before and after the creep test on the same specimen from 0.1 to 100 radian per second (rad/s). Compare the complex viscosity values of the two tests; if the difference of the viscosity values at 0.1 rad/s is greater than 5%, consider the sample to have been degraded during the creep test, and discarded the result.

Figure 2:
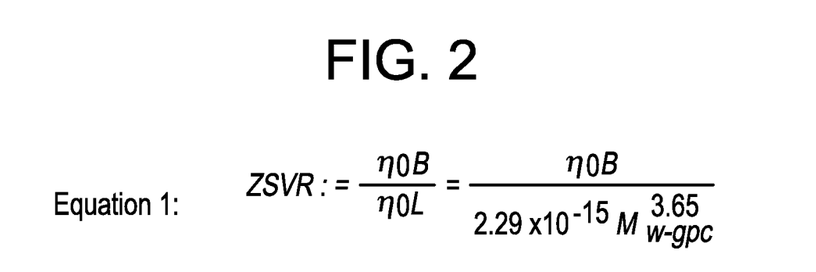
FIG. 2 states Equation 1 for calculating zero shear viscosity ratio (ZSVR).

Define the Zero-Shear Viscosity Ratio (ZSVR) of the (B) multimodal uHDPE composition as the ratio of the zero-shear viscosity (ZSV) value ($\eta_{oB}$) of the LCB-containing PE homopolymer component to the ZSV value ($\eta_{oL}$) of the linear polyethylene homopolymer component at the equivalent weight average molecular weight ($M_w$-gpc) according to the following Equation 1 in FIG. 2.

For the ZSVR, obtain the ZSV values $\eta_{oB}$ and $\eta_{oL}$ from creep test at 190° C. via the above method. Determine the Mw-gpc value by the conventional GPC method by the above method. Establish a correlation between ZSV value $\eta_{oL}$ of linear polyethylene and its Mw-gpc based on a series of linear polyethylene reference materials. The ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891, describes the ZSV value-Mw relationship. The ZSVR value obtained by the ZSVR Test Method is an indicator of the amount of long chain branching (LCB) in the (B) multimodal uHDPE composition, wherein the greater the ZSVR value, the greater the amount of the LCB in the (B) multimodal uHDPE composition distribution.

EXAMPLES

Polyethylene-nucleation agent (PE-Nucl. Agt.) (A5): a combination of (A1) calcium (1R,2S)-cis-cyclohexane-1,2-dicarboxylate (1:1) and (A3) zinc stearate (1:2).

Multimodal uHDPE Composition (B1): made by Solution Polymerization Procedure 1 and having a density of 0.966 g/cm$^3$, a ZSVR of 3.7, and a melt flow ratio ($I_{21}/I_2$) of 41.

Low Density Polyethylene C1 ("LDPE (C1)"): an embodiment of the (C) LDPE polymer that is a high pressure reactor, low density polyethylene (HPR-LDPE) polymer having density of 0.921 g/cm$^3$, degree of crystallinity of 53.2%, melting peak temperature of 106.71° C., last melting peak temperature of 112.98° C., melt index ($I_2$) of 2.15 g/10 min., HLMI ($I_{21}$) of 129.9 g/10 min., and melt flow ratio ($I_{21}/I_2$) of 60.3. Available as a high-pressure reactor LDPE from The Dow Chemical Company, Midland, Mich., USA.

Comparative Example 1 (CE1): a commercially available tree retardant (PEG)-containing crosslinked polyethylene ("TR-XLPE") only, obtained as product number HFDB-4202 from The Dow Chemical Company.

Antioxidant (E1): octadecyl 3,5-di-tert-butyl-4-hydroxyhydrocinnamate, used at 250 parts per million by weight per total formulation weight (ppm).

Antioxidant (E2): tetrakis(methylene(3,5-di-tert-butyl-4-hydroxyhydrocinnamate)methane, used at 200 ppm.

Antioxidant (E3): tris(2,4-di-tert-butyl-phenyl)phosphite, used at 1000 ppm.

Precatalyst 1: dimethyl[[2,2'''-[1,3-propanediylbis(oxy-.kappa.O)]bis[3'',5,5''-tris(1,1-dimethylethyl)-5'-methyl[1,1':3',1''-terphenyl]-2'-olato-.kappa.O]](2-)]-, (OC-6-33)-zirconium.

Cocatalyst 1: bis(hydrogenated tallow alkyl)methylammonium tetrakis(pentafluoro phenyl)borate(1-).

Cocatalyst 2: modified methylaluminoxane (MMAO).

Figure 3:
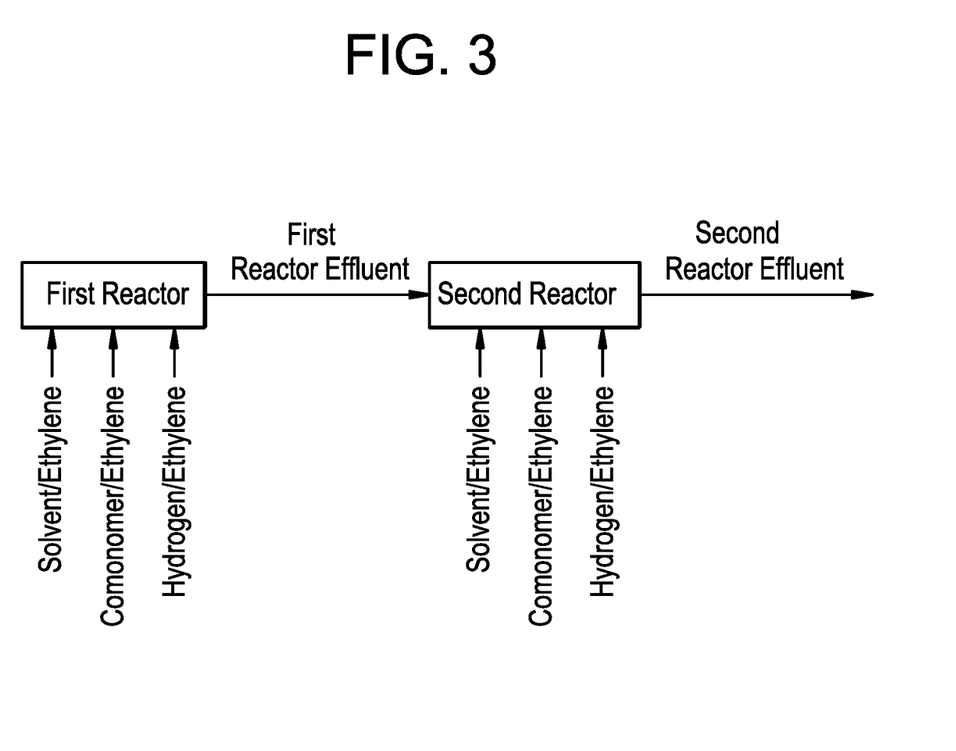
FIG. 3 diagrams a serial solution phase polymerization reaction process.

Polymerization Procedure 1: for using a single catalyst and solution phase polymerization process for making (B) multimodal uHDPE compositions that are bimodal uHDPE copolymer compositions, optionally containing 0, 1 or more additives. Materials. Purified ethylene and isoparaffinic solvent (Isopar-E) with molecular sieves before use. Separately pressurized ethylene feed stream and solvent feed to above reaction pressure. Batch diluted individual catalyst-making components (precatalyst and cocatalysts) to suitable component concentrations with purified solvent and pressurized to above reaction pressure. Measured all reaction feed flows with mass flow meters and independently controlled them with computer automated valve control systems. Used two continuous solution polymerization reactors in series configuration as diagramed in FIG. 3. Each reactor is a liquid full, non-adiabatic, isothermal, circulating, loop reactor which mimics a continuously stirred tank reactor (CSTR) with heat removal. Temperature controlled total fresh feed stream to each reactor (solvent, ethylene, and hydrogen) to maintain a single solution phase by passing feed stream through a heat exchanger. Injected total fresh feed into each reactor via injectors at two locations with approximately equal reactor volumes between each injection location. Each injector received half of the total fresh feed mass flow. Injected catalyst-making components into reactors through injection stingers. Controlled feed of Precatalyst 1 to maintain each reactor ethylene conversion at specified targets. Fed Cocatalyst 1 and Cocatalyst 2 based on calculated specified molar ratios relative to Precatalyst 1. Immediately following each reactor feed injection location, mixed feed streams with circulating reactor contents with static mixing elements. Continuously circulated contents of each reactor through heat exchangers responsible for removing much of heat of reaction and with the temperature of coolant side responsible for maintaining an isothermal reaction environment at specified temperature. Effluent from the first reactor (containing solvent, ethylene, hydrogen, catalyst-making components, and polymer) exits the first reactor loop and is added into the second reactor loop. Effluent from the second reactor enters a zone where it is deactivated with water. Add Antioxidants (E1) to (E3) at this same reactor exit location for polymer stabilization (e.g., antioxidant) to give the multimodal uHDPE compositions also comprising Antioxidants (E1) to (E3). Flows of reactor stream feed data that correspond to the process conditions used to produce the example polymer are shown in Table 1. Table 1 presents the data in such a way that accounts for complexity of solvent recycle system, and thus the reaction system can be treated more simply as a once through flow diagram.

TABLE 1 process conditions for Polymerization Procedure 1.

| Condition | Value |
| --- | --- |
| First Reactor Feed Solvent/Ethylene Mass Flow Ratio (wt/wt) | 5.4 |
| First Reactor Feed Comonomer/Ethylene Mass Flow Ratio (wt/wt) | 0* |
| First Reactor Feed Hydrogen/Ethylene Mass Flow Ratio (wt/wt) | 0.00022 |
| First Reactor Temperature (° C.) | 160 |
| First Reactor Pressure (MPa) | 5 |
| First Reactor Ethylene Conversion | 72.8 |
| First Reactor Precatalyst | Precatalyst 1 |
| First Reactor First Cocatalyst | Cocatalyst 1 |
| First Reactor Second Cocatalyst | Cocatalyst 2 |
| First Reactor Cocatalyst 1/Precatalyst 1 molar ratio (mol B/mol Zr) | 1.5 |
| First Reactor Cocatalyst 2/Precatalyst 1 molar ratio (mol Al/mol Zr) | 10.2 |
| First Reactor Residence Time (minutes) | 10.8 |
| Second Reactor Feed Solvent/Ethylene Mass Flow Ratio (wt/wt) | 2.5 |
| Second Reactor Feed Comonomer/Ethylene Mass Flow Ratio (wt/wt) | 0* |
| Second Reactor Feed $H_2$/Ethylene Mass Flow Ratio (wt/wt) | 0.0016 |
| Second Reactor Temperature (° C.) | 200 |
| Second Reactor Pressure (MPa) | 5 |
| Second Reactor Ethylene Conversion (%) | 85.8 |
| Second Reactor Precatalyst | Precatalyst 1 |
| Second Reactor First Cocatalyst | Cocatalyst 1 |
| Second Reactor Second Cocatalyst | Cocatalyst 2 |
| Second Reactor Cocatalyst 1/Precatalyst 1 Molar Ratio (mol B/mol Zr) | 0.7 |
| Second Reactor Cocatalyst 2/Precatalyst 1 Molar Ratio (mol Al/mol Zr) | 4.7 |
| Second Reactor Residence Time (minutes) | 4.5 |

*No comonomer was used in Polymerization Procedure 1.

Inventive Example 1 (IE1): dielectrically-enhanced polyethylene formulation comprises a crystallized melt-blend of multimodal uHDPE Composition (B1) containing 0.075 wt % of Polyethylene-nucleation agent (A5) and antioxidants (E1), (E2), and (E3). (B1) is a bimodal ultra-high density polyethylene (bimodal uHDPE) composition consisting essentially of a LCB-containing PE homopolymer component and a linear polyethylene homopolymer component. IE1 has a density of 0.9634 g/cm$^3$, a degree of crystallinity of 79.8%, a melting peak temperature of 135° C., a melt index ($I_2$) of 1.2 g/10 min., a HLMI ($I_{21}$) of 47.4 g/10 min., a melt flow ratio ($I_{21}/I_2$) of 39.5, and a zero shear viscosity at 190° C. of 107,800 pascal-seconds (Pa-s) measured in accordance with the ZSV Test Method.

Inventive Example 2 (IE2): dielectrically-enhanced polyethylene formulation comprises a crystallized melt-blend of a bimodal uHDPE (B1)/LDPE (C1) Blend (70:30) containing 0.0525 wt % of Polyethylene-nucleation agent (A5) and antioxidants (E1), (E2), and (E3). IE2 comprises 70 wt % of (B1) and 30 wt % of (C1) and has a density of 0.9471 g/cm$^3$, a degree of crystallinity of 56%, a melting peak temperature of 134.66° C., a melt index ($I_2$) of 1.6 g/10 min., a HLMI ($I_{21}$) of 99.0 g/10 min., and a melt flow ratio ($I_{21}/I_2$) of 61.9.

Inventive Example 3 (IE3): dielectrically-enhanced polyethylene formulation comprises a crystallized melt-blend of a bimodal uHDPE (B1)/LDPE (C1) Blend (50:50) containing 0.0375 wt % of Polyethylene-nucleation agent (A5) and antioxidants (E1), (E2), and (E3). IE3 comprises 50 wt % of (B1) and 50 wt % of (C1) and has a density of 0.9396 g/cm$^3$, a degree of crystallinity of 59%, a melting peak temperature of 131.54° C., a last melting peak temperature of 140.14° C., a melt index ($I_2$) of 1.3 g/10 min., a HLMI ($I_{21}$) of 70.0 g/10 min., and a melt flow ratio ($I_{21}/I_2$) of 53.8.

Inventive Example 4 (IE4): dielectrically-enhanced polyethylene formulation comprises a crystallized melt-blend of a bimodal uHDPE (B1)/LDPE (C1) Blend (30:70 containing 0.0225 wt % of Polyethylene-nucleation agent (A5) and antioxidants (E1), (E2), and (E3). IE4 comprises 30 wt % of (B1) and 70 wt % of (C1) and has a density of 0.9324 g/cm$^3$, a degree of crystallinity of 54%, a melting peak temperature of 128.65° C., a melt index ($I_2$) of 1.4 g/10 min., a HLMI ($I_{21}$) of 82.6 g/10 min., and a melt flow ratio ($I_{21}/I_2$) of 59.0.

CE1, LDPE (C1), and IE1 to IE4 were characterized by density, degree of crystallinity, melting peak temperature, last melting peak temperature, melt index ($I_2$), HLMI ($I_{21}$), melt flow ratio ($I_{21}/I_2$), AC electrical breakdown strength before and after wet aging, storage modulus, and a zero shear viscosity at 190° C. according to the respective methods described above. The results for AC electrical breakdown strength before and after wet aging, storage modulus, and a zero shear viscosity at 190° C. are reported below in Table 2.

TABLE 2

CE1, LDPE (C1), and IE1 to IE4 ("0" means 0.00)

| Constituent (wt %) | LDPE (C1) | CE1 | IE1 | IE2 | IE3 | IE4 |
|---|---|---|---|---|---|---|
| TR-XLPE | 0 | 100 | 0 | 0 | 0 | 0 |
| HPR-LDPE (C1) | 100 | 0 | 0 | 30.0 | 50.0 | 70.0 |
| Multimodal uHDPE Composition (B1) and antioxidants (E1)-(E3) | 0 | 0 | 100 | 70.0 | 50.0 | 30.0 |
| PE-Nucl. Agt. (A1)/(A3) | 0 | 0 | 0.075 | 0.0525 | 0.0375 | 0.0225 |
| Example Total | 100.0 | 100.0 | 100.0 | 100.0 | 100.0 | 100.0 |

| Property Tested | LDPE (C1) | CE1 | IE1 | IE2 | IE3 | IE4 |
|---|---|---|---|---|---|---|
| Unaged AC electrical breakdown strength (kV/mm) | 37.5 (Std. Dev. 2.9) | 39 (Std. Dev. N/d) | 39.6 (Std. Dev. 1.1) | 40.1 (Std. Dev. 0.9) | 39.5 (Std. Dev. 0.8) | 39.9 (Std. Dev. 0.9) |
| 0.01 M NaCl$_{aq}$ aged AC electrical breakdown strength (kV/mm) | 23.8 (Std. Dev. 3.8) | 31.6 (Std. Dev. 1.5) | 37.2 (Std. Dev. 0.8) | 37.1 (Std. Dev. 0.7) | 36.6 (Std. Dev. 1.3) | 34.8 (Std. Dev. 2.9) |
| Retention of AC electrical breakdown strength (%) | 63 | 71 | 94 | 93 | 93 | 88 |
| Storage modulus (110° C., MPa) | 40.5 | N/t | 377 | 241 | 172 | 104 |
| Storage modulus (120° C., MPa) | 0 | N/t | 259 | 158 | 106 | 55.8 |
| Storage modulus (130° C., MPa) | 0 | N/t | 151 | 91.3 | 69.2 | 68.8 |
| Zero Shear Viscosity at 190° C. (Pa-S)* | 68,730 | N/t | 107,800 | 94,920 | 94,340 | 117,100 |

N/d means not determined. N/t means not tested.
*Based on ZSV Test Method.

The data in Table 2 show the dielectrically-enhanced polyolef in formulations of IE1 to IE4 significantly improve wet electrical aging performance relative to that of (C) LDPE alone (LDPE (C1)). Without wishing to be found by theory, we believe that the crystalline phase structure of the (B) multimodal uHDPE composition made with the (A) polyethylene-nucleation agent and used in IE1 to IE4 is responsible for their higher AC electrical breakdown strength after exposure thereof to accelerated wet electrical aging conditions, and thus their improved retention of AC electrical breakdown strength relative to LDPE (C1) and CE1. The dielectrically-enhanced polyolef in formulations of IE1 to IE4 retained AC electrical breakdown strength above 85%, whereas the retained AC electrical breakdown strength for LDPE (C1) was just 63%. Further, the performance of IE1 to IE4 unpredictably exceeds that of commercially available tree retardant (PEG)-containing crosslinked polyethylene ("TR-XLPE", CE1), which retained an AC electrical breakdown strength of 71% percent after accelerated wet electrical aging.

The storage modulus values of the dielectrically-enhanced polyolef in formulations of IE1 to IE4 are much greater than that of the (C) LDPE polymer by itself (LDPE (C1)) in the temperature range from 90° to 140° C. (>5 MPa between 110° and 130° C.). LDPE-based insulation melts, i.e., experiences a complete loss of modulus, around 110° C. Surprisingly, the dielectrically-enhanced polyolefin formulations of IE1 to IE4 maintain dimensional stability, which may beneficially extend (increase) maximum service temperature of the dielectrically-enhanced polyethylene formulation and (2) insulation component up to 140° C. Service temperature is the temperature at which the dielectrically-enhanced polyethylene formulation, and thus the (2) insulation component, may be used in real world applications without loss of dimensional stability. This extended maximum service temperature is especially valuable for use of the dielectrically-enhanced polyethylene formulation and (2) insulation component in high voltage and extra-high voltage power cables.

Zero shear viscosities of the dielectrically-enhanced polyolefin formulations of IE1 to IE4 are much greater (>20%) than the zero shear viscosity of the (C) LDPE polymer by itself (LCPE (C1)) at 190° C. Zero shear viscosity at 190° C. is related to sagging behavior of polyolefin insulation materials in continuous vulcanization (CV) process that use hot nitrogen gas or steam during manufacture insulated power cables. The sagging undesirably affects concentricity of the resulting insulated power cable. The higher the zero shear viscosity of the dielectrically-enhanced polyethylene formulation, the better the resistance of the (2) insulation component to sagging during the CV process.

In some aspects the dielectrically-enhanced polyethylene formulation further comprises any one of (i) to (iv): (i) the (C) LDPE; (ii) (C1); (iii) at least one, alternatively any two, alternatively each of antioxidants (E1), (E2), and (E3); and (iv) (C1), (E1), (E2), and (E3).

The invention claimed is:

1. An insulated electrical device comprising (1) an electrical component and (2) an insulation component, disposed in operative contact with the electrical component, the insulation component comprising a dielectrically-enhanced polyethylene formulation comprising a crystallized melt-blend of constituents (A), (B), and optionally (C): from 0.01 to 1.00 weight percent (wt %) of (A) a polyethylene-nucleation agent; from 29.00 to 99.99 weight percent of (B) a multimodal ultra-high density polyethylene (multimodal uHDPE) composition, comprising a long-chain branched polyethylene homopolymer component and a linear polyethylene homopolymer component, and characterized by a first density, d1, from 0.958 to 0.970 gram per cubic centimeter (g/cm3), measured according to ASTM D792-13, Method B; and from 0.00 to 71.00 wt % of (C) a low density polyethylene (LDPE) polymer; and wherein the dielectrically-enhanced polyethylene formulation has a degree of crystallinity of from 40.0% to <85.0%, measured according to Degree of Crystallinity Test Method; wherein the (A) polyethylene -nucleation agent is selected from the group consisting of (A1) to (A7): (A1) calcium (1R,2S)-cis-cyclohexane-1,2-dicarboxylate (1:1); (A2) calcium stearate (1:2); (A3) zinc stearate (1:2); (A4) a combination of (A1) and (A2); (A5) a combination of (A1) and (A3); (A6) a combination of (A2) and (A3); and (A7) a combination of (A1), (A2), and (A3).

2. The insulated electrical device of claim 1 wherein the (1) electrical component comprises (1a) a conductive element in need of electrical insulation and, optionally, (1b) a semiconductive shield coating disposed in direct contact with the conductive element; wherein when the (1b) is absent the (2) insulation component is disposed in direct contact with the (1a) conductive element and when the (1b) is present the (2) insulation component is disposed in direct contact with the (1b) semiconductive shield coating, which is disposed between (1a) and (2).

3. The insulated electrical device of claim 1, selected from the group consisting of: an insulated battery; an insulated connector; an insulated diode; an insulated display; an insulated fuel cell; an insulated electrical generator; an insulated integrated circuit; an insulated inverter; an insulated photovoltaic cell module; an insulated power cable; an insulated power supply; an insulated terminal; an insulated transistor; and an insulated wire.

4. The insulated electrical device of any one of claim 1 comprising an insulated power cable wherein the conductive element of the electrical component comprises a conductive core and wherein the electrical component further comprises, sequentially from the conductive core outward: an inner semiconductive shield layer disposed in direct contact with the conductive core, an insulation layer comprising the insulation component and disposed in direct contact with the inner semiconductive shield layer, an outer semiconductive shield layer disposed in direct contact with the insulation layer, and an outer jacketing layer disposed in direct contact with the outer semiconductive shield layer.

* * * * *